(12) United States Patent
Lee et al.

(10) Patent No.: US 8,053,534 B2
(45) Date of Patent: Nov. 8, 2011

(54) THERMOPLASTIC RESIN COMPOSITION AND MOLDED PRODUCT MADE USING THE SAME

(75) Inventors: Byung-Choon Lee, Uiwang-si (KR); Tae-Uk Kim, Uiwang-si (KR); Doo-Han Ha, Uiwang-si (KR)

(73) Assignee: Cheil Industries, Inc., Gumi-si (KR)

( * ) Notice: Subject to any disclaimer, the term of this patent is extended or adjusted under 35 U.S.C. 154(b) by 84 days.

(21) Appl. No.: 12/629,137

(22) Filed: Dec. 2, 2009

(65) Prior Publication Data

US 2010/0160560 A1    Jun. 24, 2010

(30) Foreign Application Priority Data

Dec. 22, 2008   (KR) .................. 10-2008-0131320

(51) Int. Cl.
C08L 69/00   (2006.01)
(52) U.S. Cl. .................. 525/468; 525/464; 524/268
(58) Field of Classification Search .................. None
See application file for complete search history.

(56) References Cited

U.S. PATENT DOCUMENTS

| | | | |
|---|---|---|---|
| 4,027,073 A | | 5/1977 | Clark |
| 4,743,654 A | * | 5/1988 | Kyu et al. ............ 525/148 |
| 5,292,809 A | | 3/1994 | Drzewinski |
| 5,338,798 A | | 8/1994 | Drzewinski |
| 6,423,767 B1 | * | 7/2002 | Weber et al. .......... 524/158 |
| 7,365,125 B2 | * | 4/2008 | Govaerts et al. ........ 525/67 |
| 2004/0068071 A1 | | 4/2004 | Hoff et al. |
| 2008/0033108 A1 | * | 2/2008 | Kung et al. ............ 525/67 |
| 2008/0176990 A1 | | 7/2008 | Govaerts et al. |
| 2009/0118402 A1 | * | 5/2009 | Jang et al. ............ 524/127 |
| 2009/0292059 A1 | * | 11/2009 | Seidel et al. .......... 524/504 |
| 2010/0280180 A1 | * | 11/2010 | Lee et al. ............. 525/100 |

FOREIGN PATENT DOCUMENTS

JP   06-128475   5/1994

* cited by examiner

*Primary Examiner* — Marc Zimmer
(74) *Attorney, Agent, or Firm* — Summa, Additon & Ashe, P.A.

(57) ABSTRACT

Disclosed is a thermoplastic resin composition that includes: (A) about 55 to about 95 wt % of a polycarbonate resin; (B) about 1 to about 40 wt % of a polyalkyl(meth)acrylate resin having a weight average molecular weight of about 1,000,000 g/mol or more; and (C) about 0.001 to about 10 wt % of a polysiloxane resin, and a molded product made using the same.

7 Claims, No Drawings

THERMOPLASTIC RESIN COMPOSITION AND MOLDED PRODUCT MADE USING THE SAME

RELATED APPLICATIONS

This application claims priority to and the benefit of Korean Patent Application No. 10-2008-0131320 filed in the Korean Intellectual Property Office on Dec. 22, 2008, the entire disclosure of which is incorporated herein by reference.

FIELD OF THE INVENTION

The present invention relates to a thermoplastic resin composition and a molded product made using the same.

BACKGROUND OF THE INVENTION

Polycarbonate resin has excellent toughness, impact resistance, thermal stability, self-extinguishing property, dimensional stability, and heat resistance, and accordingly has been widely used in the production of electro-electronic products such as mobile phone housings, backlight frames, connectors, and the like. Polycarbonate resins have also been used to produce automobile parts such as head lamps, instrument panels, and as a substitute for glass or similar materials in lens and other applications requiring transparency and impact resistance.

However, when a product requiring transparency is made of polycarbonate, it can exhibit deteriorated or reduced scratch resistance as compared to glass. Polycarbonate materials can also yellow over time upon exposure to sunlight.

Polymethylmethacrylate (PMMA) resin has excellent weather resistance and transparency, and excellent adherence and strength such as flexural strength and flexural strain which is different from polycarbonate resin. Accordingly, PMMA resins can be used in applications such as adhesives, lighting materials, and building materials. However, PMMA has inferior impact strength as compared to that of other thermoplastic resins, so its use is limited in thin products having a certain thickness requiring sufficient impact strength.

Accordingly, when a transparent polycarbonate resin having excellent toughness and a transparent PMMA resin having excellent scratch characteristic are alloyed, it is expected that the alloy would provide both excellent impact resistance and excellent scratch resistance.

However, as mentioned in Japanese Patent Laid-Open Publication No. 1994-128475, when polycarbonate resin is alloyed with a PMMA resin, the molecular weights and weight ratio are limited to a certain range due to the miscibility and refractive index differences between the two resins. When the molecular weight and weight ratio levels of the polycarbonate and PMMA are outside of certain ranges, there is a concern that the product will exhibit a pearl effect, uneven color, and opaqueness.

Accordingly, much research has focused on improving the scratch resistance of polycarbonate.

For example, U.S. Pat. No. 4,027,073 discloses a surface treatment method of using a Si compound and a method of improving the scratch characteristic through acrylic UV coating. In addition, U.S. Pat. No. 5,338,798 discloses a method of using syndiotactic PMMA; U.S. Pat. No. 5,292,809 discloses a method of using a fluorine-substituted bisphenol; and U.S. Pat. No. 4,743,654 discloses single-phase blends of polycarbonate resin and polyalkylmethacrylate. However, the compounds have problems such as high cost and limited application fields.

SUMMARY OF THE INVENTION

One aspect of the present invention provides a thermoplastic resin composition having an excellent balance of physical properties such as scratch resistance, impact resistance, and transparency.

Another aspect of the present invention provides a molded product made using the thermoplastic resin composition.

According to one aspect of the present invention, a thermoplastic resin composition is provided that includes: (A) about 55 to about 95 wt % of a polycarbonate resin; (B) about 1 to about 40 wt % of a polyalkyl(meth)acrylate resin having a weight average molecular weight of about 1,000,000 g/mol or more; and (C) about 0.001 to about 10 wt % of a polysiloxane resin.

The thermoplastic resin composition may further include (B') a polyalkyl(meth)acrylate resin having a weight average molecular weight of about 5000 to about 60,000 g/mol. The polyalkyl(meth)acrylate resin (B') may be included in an amount of about 1 to about 20 parts by weight, based on about 100 parts by weight of the thermoplastic resin composition including (A), (B) and (C).

The polyalkyl(meth)acrylate resin (B) and polyalkyl(meth)acrylate resin (B') may be mixed in a weight ratio of about 1:1 to about 10:1.

The polycarbonate resin (A) may be prepared by reacting one or more diphenols with phosgene, halogen formate, carbonate ester, or a combination thereof.

The polysiloxane resin (C) may be represented by the following Chemical Formula 2.

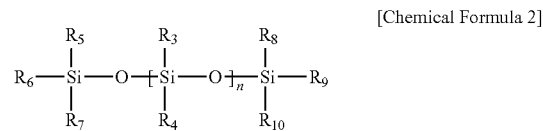

[Chemical Formula 2]

In the above Chemical Formula 2, $R_3$ to $R_{10}$ are each independently hydrogen, substituted or unsubstituted C1 to C30 alkyl, substituted or unsubstituted C2 to C30 alkenyl, or substituted or unsubstituted NRR' (wherein R and R' are each independently hydrogen or substituted or unsubstituted C1 to C30 alkyl), and $0 \leq n < 10,000$.

According to another aspect of the present invention, a molded product made from the thermoplastic resin composition is provided.

Hereinafter, further aspects of the present invention will be described in detail.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, unless a specific definition is otherwise provided, the term "alkyl" refers to a C1 to C20 alkyl.

The term "polyalkyl(meth)acrylate" refers to both "polyalkylacrylate" and "polyalkylmethacrylate."

The term "alkyl(meth)acrylate" refers to both "alkylacrylate" and "alkylmethacrylate."

The thermoplastic resin composition according to one embodiment includes: (A) about 55 to about 95 wt % of a polycarbonate resin; (B) about 1 to about 40 wt % of a polyalkyl(meth)acrylate resin having a weight average molecular weight of about 1,000,000 g/mol or more; and (C) about 0.001 to about 10 wt % of a polysiloxane resin.

Exemplary components included in the thermoplastic resin composition according to various embodiments of the invention will hereinafter be described in detail. However, these embodiments are only exemplary, and the present invention is not limited thereto.

(A) Polycarbonate Resin

The polycarbonate resin may be prepared by reacting one or more diphenols of the following Chemical Formula 1 with phosgene, halogen formate, carbonate ester, or a combination thereof.

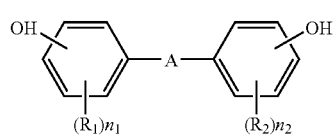

[Chemical Formula 1]

In the above Chemical Formula 1,

A is a linker comprising a single bond, substituted or unsubstituted C1 to C30 linear or branched alkylene, substituted or unsubstituted C2 to C5 alkenylene, substituted or unsubstituted C2 to C5 alkylidene, substituted or unsubstituted C1 to C30 linear or branched haloalkylene, substituted or unsubstituted C5 to C6 cycloalkylene, substituted or unsubstituted C5 to C6 cycloalkenylene, substituted or unsubstituted C5 to C10 cycloalkylidene, substituted or unsubstituted C6 to C30 arylene, substituted or unsubstituted C1 to C20 linear or branched alkoxylene, halogen formate, carbonate ester, CO, S, or $SO_2$, each $R_1$ and $R_2$ is independently substituted or unsubstituted C1 to C30 alkyl or substituted or unsubstituted C6 to C30 aryl, and $n_1$ and $n_2$ are each independently integers ranging from 0 to 4.

The term "substituted" unless otherwise defined herein refers to one substituted with at least one or more substituent(s) comprising halogen, C1 to C30 alkyl, C1 to C30 haloalkyl, C6 to C30 aryl, C1 to C20 alkoxy, or a combination thereof.

The diphenols represented by the above Chemical Formula 1 may be used in combinations to form repeating units of the polycarbonate resin. Exemplary diphenols include without limitation hydroquinone, resorcinol, 4,4'-dihydroxydiphenyl, 2,2-bis-(4-hydroxyphenyl)propane (referred to as "bisphenol-A"), 2,4-bis-(4-hydroxyphenyl)-2-methylbutane, bis-(4-hydroxyphenyl)methane, 1,1-bis-(4-hydroxyphenyl)cyclohexane, 2,2-bis-(3-chloro-4-hydroxyphenyl)propane, 2,2-bis-(3,5-dimethyl-4-hydroxyphenyl)propane, 2,2-bis-(3,5-dichloro-4-hydroxyphenyl)propane, 2,2-bis-(3,5-dibromo-4-hydroxyphenyl)propane, bis-(4-hydroxyphenyl)sulfoxide, bis-(4-hydroxyphenyl)ketone, bis-(4-hydroxyphenyl)ether, and the like, and combinations thereof. In one embodiment, 2,2-bis-(4-hydroxyphenyl)-propane, 2,2-bis-(3,5-dichloro-4-hydroxyphenyl)-propane, or 1,1-bis-(4-hydroxyphenyl)-cyclohexane of the diphenols may be used. In another embodiment, 2,2-bis-(4-hydroxyphenyl)-propane may be used.

In one embodiment, the polycarbonate resin can have a weight average molecular weight ranging from about 10,000 to about 200,000 g/mol, and in another embodiment, a weight average molecular weight ranging from about 15,000 to about 80,000 g/mol, but the polycarbonate resin is not limited to these molecular weights.

The polycarbonate resin may be a mixture of polycarbonate resins obtained using two or more diphenols that are different from each other. The polycarbonate resin may be a linear polycarbonate resin, a branched polycarbonate resin, a polyester carbonate copolymer, and the like, or a combination thereof.

The linear polycarbonate resin may include a bisphenol-A-based polycarbonate resin. The branched polycarbonate resin may be produced by reacting a multi-functional aromatic compound such as trimellitic anhydride, trimellitic acid, and the like with a diphenol(s) and a carbonate. The multi-functional aromatic compound may be included in an amount of about 0.05 to about 2 mol % based on the total weight of the branched polycarbonate resin. The polyester carbonate copolymer resin may be produced by reacting a difunctional carboxylic acid with a diphenol(s) and a carbonate. Exemplary carbonates may include without limitation diaryl carbonates such as diphenyl carbonate, ethylene carbonate, and the like, and combinations thereof.

The thermoplastic resin composition may include the polycarbonate resin in an amount of about 55 to about 95 wt %, for example, about 60 to about 90 wt %. When the thermoplastic resin compositions include the polycarbonate resin in an amount within these ranges, the thermoplastic resin composition can have excellent impact resistance.

(B) Polyalkyl(meth)acrylate Resin

The polyalkyl(meth)acrylate resin may include a single polyalkyl(meth)acrylate resin having a high molecular weight, or the polyalkyl(meth)acrylate resin may include a mixture of a polyalkyl(meth)acrylate resin having a high molecular weight and a polyalkyl(meth)acrylate resin having a low molecular weight.

The polyalkyl(meth)acrylate resin having a high molecular weight may have a weight average molecular weight of about 1,000,000 g/mol or more, for example about 1,000,000 to about 4,000,000 g/mol. When the thermoplastic resin composition includes the polyalkyl(meth)acrylate resin having a high molecular weight within the above ranges, the thermoplastic resin composition may exhibit an excellent balance of physical properties such as scratch resistance, impact resistance, and transparency.

The polyalkyl(meth)acrylate resin having a low molecular weight may have a weight average molecular weight of about 5000 to about 60,000 g/mol.

Conventionally polycarbonate is blended with polyalkyl(meth)acrylate resin that is commercially available having a weight average molecular weight of about 60,000 g/mol, so when it is blended with a polycarbonate resin, it is difficult to produce a transparent blend due to the differences between the refractive indices of the resins and the low compatibility between the two materials. The inventors have found, however, that when polycarbonate is used with polyalkyl(meth)acrylate resin having a weight average molecular weight of about 1,000,000 g/mol or higher, alone or together with polyalkyl(meth)acrylate resin having a weight average molecular weight of about 5000 to about 60,000 g/mol, it is possible to provide excellent scratch resistance and transparency as compared to blends of polycarbonate with conventional polyalkyl (meth)acrylate.

The polyalkyl(meth)acrylate resin according to one embodiment may include a homopolymer having a main component of alkyl(meth)acrylate; a copolymer including two or more of different alkylacrylates, alkylmethacrylates, or combinations thereof; or a mixture or combination thereof.

The polyalkyl(meth)acrylate resin may be manufactured using conventional processes that are well-known to a person skilled in the art. For example, the polymethylmethacrylate (PMMA) resin may be obtained by polymerizing methylmethacrylate (MMA).

The thermoplastic resin composition can include the polyalkyl(meth)acrylate resin having a high molecular weight in an amount of about 1 to about 40 wt %, for example about 5 to about 25 wt. When the thermoplastic resin composition includes the polyalkyl(meth)acrylate resin having a high molecular weight in an amount in these ranges, it is possible to provide a thermoplastic resin composition with excellent scratch resistance, impact resistance, and transparency.

The polyalkyl(meth)acrylate resin having a high molecular weight may be mixed with the polyalkyl(meth)acrylate resin having a low molecular weight in a weight ratio of about 1:1 to about 10:1, and in another embodiment, in a weight ratio of about 1.5:1 to about 4:1. When the polyalkyl(meth)acrylate resin having a high molecular weight is mixed with the polyalkyl(meth)acrylate resin having a low molecular weight in the above weight ratios, it is possible to provide a resin composition with an excellent balance of physical properties such as scratch resistance, impact resistance, and transparency.

The thermoplastic resin composition can include the polyalkyl(meth)acrylate resin having a low molecular weight in an amount of about 1 to about 20 parts by weight, for example about 3 to about 15 parts by weight, based on about 100 parts by weight of the thermoplastic resin composition, which is the total amount of (A) polycarbonate resin, (B) polyalkyl (meth)acrylate resin having a high molecular weight, and (C) a polysiloxane resin (i.e., the total amount of (A) polycarbonate resin, (B) polyalkyl(meth)acrylate resin having a high molecular weight, and (C) a polysiloxane resin). When the thermoplastic resin composition includes the polyalkyl (meth)acrylate resin having low molecular weight in the above amounts, it is possible to provide a thermoplastic resin composition with excellent scratch resistance, impact resistance, and transparency.

(C) Polysiloxane Resin

The polysiloxane resin according to one embodiment is a copolymer represented by the following Chemical Formula 2.

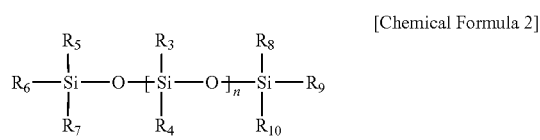

[Chemical Formula 2]

In the above Chemical Formula 2, $R_3$ to $R_{10}$ are each independently hydrogen, substituted or unsubstituted C1 to C30 alkyl, substituted or unsubstituted C2 to C30 alkenyl, or substituted or unsubstituted NRR' (wherein R and R' are each independently hydrogen or substituted or unsubstituted C1 to C30 alkyl), and $0 \leq n < 10{,}000$.

The term "substituted" as used with reference to Chemical Formula 2 refers to one substituted with at least one (or more) substituent comprising C1 to C30 alkyl, C2 to C30 alkenyl, NRR' (wherein R and R' are each independently hydrogen or C1 to C30 alkyl), or a combination thereof.

According to one embodiment, the polysiloxane resin may include polydialkyl siloxane in which each of $R_3$ to $R_{10}$ is a C1 to C30 alkyl group in Chemical Formula 2, and according to another embodiment, the polysiloxane resin may include polydimethyl siloxane in which each of $R_3$ to $R_{10}$ is a methyl group. The polydimethyl siloxane has a characteristic of low glass transition temperature (Tg: −160° C.), so it may act as a impact-reinforcing agent for improving the impact strength at a low temperature.

When $0 \leq n < 10{,}000$ in Chemical Formula 2, it is beneficial for the extruding process since the impact resistance can be excellent and the ideal viscosity can be maintained.

The thermoplastic resin compositions can include the polysiloxane resin in an amount of about 0.001 to about 10 wt %, for example about 0.01 to about 5 wt %. When the thermoplastic resin composition includes the polysiloxane resin in an amount within these ranges, the thermoplastic resin composition may have an excellent balance of physical properties such as scratch resistance, impact strength, and transparency.

(D) Other Additives

The thermoplastic resin composition according to one embodiment may further include one or more additives.

Exemplary additives may include without limitation antibacterial agents, heat stabilizers, antioxidants, release agents, light stabilizers, compatibilizers, inorganic material additives, surfactants, coupling agents, plasticizers, impact-reinforcing agents, admixtures, stabilizers, lubricants, antistatic agents, flame-proofing agents, weather-resistance agents, colorants, ultraviolet (UV) blocking agents, fillers, nucleating agents, adhesion aids, adhesives, flame retardants, and the like and combinations thereof.

Exemplary antioxidants may include without limitation phenol-type antioxidants, phosphite-type antioxidants, thioether-type antioxidants, amine-type antioxidants, and the like, and combinations thereof. Exemplary release agents may include without limitation fluorine-including polymers, silicone oils, metal salts of stearic acid, metal salts of montanic acid, montanic acid ester waxes, polyethylene waxes, and the like, and combinations thereof. Exemplary weather-resistance agents may include without limitation benzophenone-type weather-resistance agents, amine-type weather-resistance agents, and the like, and combinations thereof. Exemplary colorants may include without limitation dye, pigments, and the like, and combinations thereof. Exemplary ultraviolet (UV) blocking agents may include without limitation titanium dioxide ($TiO_2$), carbon black, and the like, and combinations thereof. Exemplary filler may include without limitation glass fiber, carbon fiber, silica, mica, alumina, clay, calcium carbonate, sulfuric acid calcium, glass beads, and the like, and combinations thereof. When the filler is included, it may improve mechanical strength, heat resistance, and the like. Exemplary nucleating agents may include without limitation talc, clay, and the like, and combinations thereof. Exemplary flame retardants may include without limitation phosphorous flame retardants, nitrogen compound-based flame retardants, silicon-based flame retardants, inorganic flame retardants, and the like, and combinations thereof.

The thermoplastic resin composition may include the additive in an amount of about 0.1 to about 30 parts by weight, based on about 100 parts by weight of the thermoplastic resin composition (i.e., the total amount of (A) polycarbonate resin, (B) polyalkyl(meth)acrylate resin having a high molecular weight, and (C) a polysiloxane resin). When the thermoplastic resin composition includes the additive in an amount within this range, it is possible to provide the desirable effects of additives and to improve mechanical properties and surface appearance.

In addition, the thermoplastic resin composition of the invention may be formed into pellets according to one embodiment using generally known methods. For example, the pellets can be prepared by mixing each component of the composition and optionally any additives and then melt-extruding the mixture in an extruder.

According to another embodiment, a product molded by using the thermoplastic resin composition of the embodiment is provided. The molded product can be prepared using conventional techniques in the art, such as but not limited to extrusion molding, injection molding, blow molding, and the like.

The thermoplastic resin composition improves compatibility between polycarbonate resin and polyalkyl(meth)acrylate resin to provide excellent impact strength and an excellent balance of physical properties such as scratch resistance and transparency. Therefore, the thermoplastic resin composition may be used for various molded products requiring scratch resistance, impact resistance, transparency, and high dyeability such as a housing part of an electro-electronic product and an automobile precision part.

The following examples illustrate the embodiment in more detail. However, it is understood that the embodiment is not limited by these examples.

EXAMPLES

A thermoplastic resin composition according to one embodiment includes each component as follows.

(A) Polycarbonate Resin

PANLITE L-1250WP manufactured by Teijin Chemicals Ltd., which is bisphenol-A linear polycarbonate having a weight average molecular weight of 25,000 g/mol, is used.

(B) Polyalkyl(meth)acrylate Resin (B-1) K-125 manufactured by Rohm and Haas, which is polymethylmethacrylate (PMMA) having a weight average molecular weight of 3,500,000 g/mol, is used.

(B-2) polymethylmethacrylate (PMMA) having a weight average molecular weight of 10,000 g/mol that is obtained by polymerizing methylmethacrylate (MMA) acrylic resin is used.

(B-3) L-84 manufactured by MRC, which is polymethylmethacrylate (PMMA) having a weight average molecular weight of 95,000 g/mol, is used.

(C) Polysiloxane Resin

TSF-451 manufactured by Momentive Performance Materials Inc., which is polydimethyl siloxane having a viscosity of 100 cSt, is used.

Examples 1 to 4 and Comparative Examples 1 to 4

The components are reacted in the amount shown in the following Table 1 in a reaction extruder having a feed rate of 40 kg/hr, a screw rpm of 240, a temperature of 250 to 300° C., a screw configuration of 45ϕ Regular, and L/D=36.

The mixture is then extruded using a general twin screw extruder at a temperature of 180 to 240° C. to provide a pressed pellet.

Experimental Examples

The pellets obtained from Examples 1 to 4 and Comparative Examples 1 to 4 are dried at 90° C. for 3 hours or more and injected using a injection molding machine having a molding capacity of 10 oz under the conditions of a molding temperature of 220 to 280° C. and a mold temperature 60 to 100° C. to provide a physical property specimen. The physical properties of the specimen are measured according to the following methods, and the results are shown in the following Table 1.

(1) Scratch resistance: A tungsten carbide stylus having a spherical point with a diameter 0.7 mm is weighted with 1 kg and applied at a speed of 75 mm/min, and then the profile is monitored using a surface profiler to determine scratch width.

(2) Impact resistance: A notch is provided to a ⅛" thick Izod specimen according to ASTM D256 and the specimen is then tested.

(3) Transparency: The haze of the specimen is measured using Gretag MacBeth Color-Eye 7000A equipment.

TABLE 1

|  |  | Examples | | | | Comparative Examples | | | |
| --- | --- | --- | --- | --- | --- | --- | --- | --- | --- |
|  |  | 1 | 2 | 3 | 4 | 1 | 2 | 3 | 4 |
| (A) polycarbonate resin (wt %) |  | 89.999 | 89.999 | 69.999 | 80 | 89.999 | 49.999 | 70 | 85 |
| (B) polyalkyl(meth)acrylate | (B-1) | 10 | 7 | 20 | 10 | — | — | 10 | 10 |
| resin (wt %) | (B-2) | — | 3 | 10 | 5 | — | 50 | 5 | 5 |
|  | (B-3) | — | — | — | — | 10 | — | — | — |
| (C) polysiloxane resin (wt %) |  | 0.001 | 0.001 | 0.001 | 5 | 0.001 | 0.001 | 15 | — |
| Scratch width (um) |  | 315 | 310 | 280 | 310 | 315 | 280 | 325 | 290 |
| Izod (⅛") (kgf · cm/cm) |  | 52 | 50 | 48 | 54 | 12 | 2 | 55 | 18 |
| Haze (%) |  | 5 | 5 | 10 | 38 | 34 | 20 | 54 | 5 |

As shown in Table 1, Examples 1 to 4 including the single polyalkyl(meth)acrylate resin having a high molecular weight according to one embodiment or a mixture of polyalkyl(meth)acrylate resin having a high molecular weight and polyalkyl(meth)acrylate resin having a low molecular weight have a superior balance of scratch resistance, impact resistance, and transparency as compared to Comparative Example 1 including polyalkyl(meth)acrylate resin having a molecular weight outside of the invention, Comparative Example 2 including an excessive amount of polyalkyl(meth) acrylate resin having a low molecular weight, Comparative Example 3 including polysiloxane resin in an amount outside of the invention, and Comparative Example 4 with no polysiloxane resin.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising:
(A) about 55 to about 95 wt % of a polycarbonate resin;
(B) about 1 to about 40 wt % of a polyalkyl(meth)acrylate resin having a weight average molecular weight of about 1,000,000 g/mol or more; and
(C) about 0.001 to about 10 wt % of a polysiloxane resin, wherein the polysiloxane resin (C) is represented by the following Chemical Formula 2:

[Chemical Formula 2]

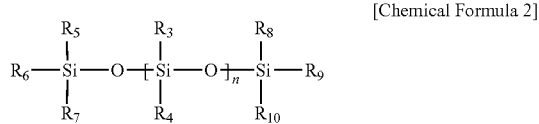

wherein, in the above Chemical Formula 2,
$R_3$ to $R_{10}$ are each independently hydrogen, substituted or unsubstituted C1 to C30 alkyl, substituted or unsubstituted C2 to C30 alkenyl, or substituted or unsubstituted NRR', wherein R and R' are each independently hydrogen or substituted or unsubstituted C1 to C30 alkyl, and $0 \leq n \leq 10,000$.

2. The thermoplastic resin composition of claim 1, wherein the thermoplastic resin composition further comprises (B') a polyalkyl(meth)acrylate resin having a weight average molecular weight of about 5000 to about 60,000 g/mol.

3. The thermoplastic resin composition of claim 2, comprising the polyalkyl(meth)acrylate resin (B') in an amount of about 1 to about 20 parts by weight based on about 100 parts by weight of the thermoplastic resin composition including the polycarbonate resin (A), the polyalkyl(meth)acrylate resin having a weight average molecular weight of about 1,000,000 g/mol or more (B), and the polysiloxane resin (C).

4. The thermoplastic resin composition claim 2, wherein the polyalkyl(meth)acrylate resin (B) is mixed with the polyalkyl(meth)acrylate resin (B') in a weight ratio of about 1:1 to about 10:1.

5. The thermoplastic resin composition of claim 1, wherein the polycarbonate resin (A) is prepared by reacting one or more diphenols with phosgene, halogen formate, carbonate ester, or a combination thereof.

6. A molded product produced from the thermoplastic resin composition of claim 1.

7. A thermoplastic resin composition comprising:
(A) about 55 to about 95 wt % of a polycarbonate resin;
(B) about 1 to about 40 wt % of a polyalkyl(meth)acrylate resin having a weight average molecular weight of about 1,000,000 g/mol or more;
(C) about 0.001 to about 10 wt % of a polysiloxane resin; and
(B') a polyalkyl(meth)acrylate resin having a weight average molecular weight of about 5000 to about 60,000 g/mol in an amount of about 1 to about 20 parts by weight based on about 100 parts by weight of the thermoplastic resin composition including the polycarbonate resin (A), the polyalkyl(meth)acrylate resin having a weight average molecular weight of about 1,000,000 g/mol or more (B), and the polysiloxane resin (C),
wherein the polyalkyl(meth)acrylate resin (B) is mixed with the polyalkyl(meth)acrylate resin (B') in a weight ratio of about 1:1 to about 10:1.

* * * * *